(12) United States Patent
Hamaguchi

(10) Patent No.: US 7,733,325 B2
(45) Date of Patent: Jun. 8, 2010

(54) ELECTROPHORETIC DISPLAY APPARATUS

(75) Inventor: Atsushi Hamaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 756 days.

(21) Appl. No.: 11/618,951

(22) Filed: Jan. 2, 2007

(65) Prior Publication Data
US 2007/0164983 A1 Jul. 19, 2007

(30) Foreign Application Priority Data
Jan. 6, 2006 (JP) .............................. 2006-001010

(51) Int. Cl.
*G09G 3/34* (2006.01)
(52) U.S. Cl. ...................... 345/107; 359/296
(58) Field of Classification Search ................. 345/107; 359/296
See application file for complete search history.

(56) References Cited

U.S. PATENT DOCUMENTS

| 6,144,361 | A | 11/2000 | Gordon, II et al. | .......... 345/107 |
|---|---|---|---|---|
| 6,680,726 | B2 * | 1/2004 | Gordon et al. | .............. 345/107 |
| 6,952,305 | B2 * | 10/2005 | Endo | ........................... 359/296 |
| 7,379,229 | B2 * | 5/2008 | Yamazaki | .................... 359/296 |
| 7,432,907 | B2 * | 10/2008 | Goden | ......................... 345/107 |
| 7,605,797 | B2 * | 10/2009 | Shido | .......................... 345/107 |
| 2007/0120812 | A1 * | 5/2007 | Nagayama | .................. 345/107 |

FOREIGN PATENT DOCUMENTS

| JP | 2002162650 A | 6/2002 |
|---|---|---|
| JP | 2004061834 A | 2/2004 |
| WO | WO 2004079703 A2 * | 9/2004 |

* cited by examiner

*Primary Examiner*—Jimmy H Nguyen
(74) *Attorney, Agent, or Firm*—Fitzpatrick, Cella, Harper & Scinto

(57) ABSTRACT

An electrophoretic display apparatus is equipped with first and second substrates, an electrophoresis dispersing liquid, and first and second electrodes, and has a display state made to be a planar distribution state of charged migration particles. A first planar distribution state with the charged migration particles spread on the first or second substrate from the first electrode toward the second electrode, and a second planar distribution state with the charged migration particles spread on the first or second substrate from the second electrode toward the first electrode are formed alternately.

5 Claims, 13 Drawing Sheets

ELECTROPHORETIC DISPLAY APPARATUS

BACKGROUND OF THE INVENTION

1. Technical Field

The present invention relates to an electrophoretic display apparatus which changes a display state by changing a distribution state of charged migration particles in an electrophoresis dispersing liquid.

2. Background of the Invention

As a nonluminous display device, an electrophoretic display apparatus using an electrophoresis phenomenon is known. The electrophoresis phenomenon is a phenomenon that charged migration particles move by a coulomb force when an electric field is applied to a dispersion liquid in which the charged migration particles are dispersed in a dispersion medium. Then, the electrophoretic display apparatus performs display based on a change of the distribution state following the movement of the charged migration particles.

FIG. 14 illustrates an example of the electrophoretic display apparatus proposed in the specification of U.S. Pat. No. 6,144,361.

FIG. 14 illustrates two pixels of the electrophoretic display apparatus. A left-hand side pixel P shows a state that charged migration particles 103 disperse in the pixel P (dark state A), and a pixel P in a right-hand side in FIG. 14 illustrates a state (bright state B) that charged migration particles 103 are gathered to an electrode 101 in the periphery of the pixel. The electrode 101 which also serves as a surrounding partition, and an inside electrode 102 are arranged in each of all the pixels. A dispersion liquid 104 containing a transparent liquid and two or more charged migration particles 103 are filled in each pixel.

In the above-described electrophoretic display apparatus, when a display state is made into the bright state B, a voltage is applied between the electrode 101 and electrode 102, and an electric field which gathers the charged migration particles 103 together to the electrode 101 in the periphery of a pixel is formed. Hence, when the same display state is repeated many times, an electric field in an identical direction is applied to the dispersion liquid 104 repeatedly, and the same electric field is formed for a long time. For this reason, ions which exist in the dispersion liquid 104 are unevenly distributed, and space charge distribution is formed and is stored as a residual DC component. Consequently, there was a problem that, when displaying next, an electric field was given modulation by the residual DC component, and displacement from a desired writing level, that is, display burn-in was generated.

SUMMARY OF THE INVENTION

Then, the present invention aims at providing a driving method of an electrophoretic display apparatus which can prevent display burn-in and can perform display repeatedly in a stable state.

According to an aspect of the present invention, there is provided an electrophoretic display apparatus which is equipped with a first substrate and a second substrate which are placed opposite mutually, an electrophoresis dispersing liquid which holds charged migration particles and fills between the first substrate and the second substrate, and a first electrode and a second electrode which are located in each pixel of the electrophoretic display apparatus and generate an electric field in the electrophoresis dispersing liquid according to a voltage applied, and whose display state is made to be a planar distribution state of the charged migration particles in the pixel in view of a direction perpendicular to the first substrate or second substrate, wherein the first electrode, and the second electrode are located in an end portion of the pixel in view of a direction perpendicular to the first substrate or second substrate; and wherein a first planar distribution state that the charged migration particles spread on the first substrate or second substrate from the first electrode toward the second electrode, and a second planar distribution state that the charged migration particles spread on the first substrate or second substrate from the second electrode toward the first electrode are formed alternately.

The first planar distribution state can be comprised of making the charged migration particles migrate from the first electrode toward the second electrode after transferring the charged migration particles to an end portion of the first electrode and then interrupting their migration, and the second planar distribution state is comprised of making the charged migration particles migrate from the second electrode toward the first electrode after transferring the charged migration particles to an end portion of the second electrode, and interrupting their migration.

The charged migration particles can be changed into the second planar distribution state from the first planar distribution state without passing through transferring to an end portion of the second electrode, and the charged migration particles are changed into the first planar distribution state from the second planar distribution state without passing through transferring to an end portion of the first electrode.

In the electrophoretic display apparatus, a partition which blocks movement of the charged migration particles can be provided between the first substrate and the second substrate, and the first electrode and the second electrode are arranged along with the partition, respectively.

The partition can be arranged so as to surround a rectangular area, in view of a direction perpendicular to the first substrate or the second substrate, and the first electrode and the second electrode are arranged in mutually symmetric positions along with the partition.

The first electrode and the second electrode can be arranged along with partitions of two opposite sides of a rectangular area, respectively.

In the electrophoretic display apparatus, a third electrode can be provided in the first substrate or the second substrate.

The charged migration particles can be constructed of two charged migration particles types having reverse polarities and the same color.

Further features of the present invention will become apparent from the following description of exemplary embodiments with reference to the attached drawings.

DETAILED DESCRIPTION OF THE INVENTION

Figure 1A:
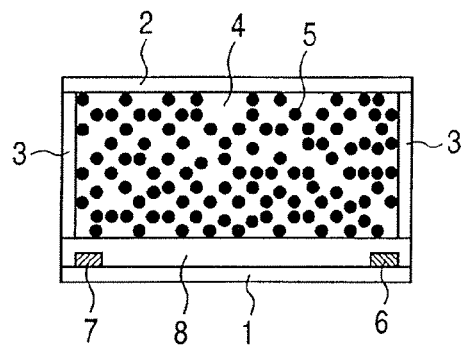
FIGS. 1A, 1B, 1C, 1D, 1E, and 1F are explanatory diagrams of an electrophoretic display apparatus according to first and second embodiments.

Hereafter, embodiments of the present invention will be described along with drawings. In addition, what the same reference characters are assigned in the same drawings or different drawings which perform the same configuration or the same action, and about these, duplicated explanation will be omitted according to circumstances. Thick arrows used in FIGS. 7A to 7E, FIGS. 9A to 9J, and FIGS. 10A to 10E illustrate rough moving directions of particles. In addition, the present invention is not limited to the following embodiments.

Embodiment 1

FIGS. 1A to 1F are sectional views illustrating schematically distribution states of particles in one pixel of an electrophoretic display apparatus of the present invention.

In the electrophoretic display apparatus in FIGS. 1A to 1F, a first substrate 1 and a second substrate 2 are arranged so as to face each other, and a partition 3 is arranged around a pixel so as to hold uniformly a gap between the first substrate 1 and second substrate 2. A dispersion liquid is filled in the pixel. The dispersion liquid contains an insulating transparent liquid, that is, a dispersion medium 4 and two or more charged migration particles (hereafter, these are also called migration particles or simply particles) 5.

On the first substrate 1 under the partition 3, the first electrode 6 and second electrode 7 are arranged just under the partition. The first electrode 6 and second electrode 7 form an electric field in the dispersion liquid by a voltage being applied. It is possible to change a distribution state of the charged migration particles 5 by changing this electric field.

A surface of the first substrate 1 is covered with an insulating layer 8. In FIGS. 1A to 1F, although surfaces of the first electrode 6 and second electrode 7 are exposed without being covered with the insulating layer 8, it is also sufficient that they are coated with the insulating layer 8.

The second substrate 2 is transparent and the insulating layer 8 is colored in white.

When a surface (this is called "display surface" below) of the insulating layer 8 is covered by the charged migration particles 5, black of the charged migration particles 5 is seen when the second substrate 2 is seen from the above, and the insulating layer 8 is exposed to be seen in white when the particles 5 are leaned and distributed to one side. When intermediate distribution is taken, the black of the particles 5 and the white of the insulating layer 8 are mixed, and it is visible in intermediate brightness. In this way, in the electrophoretic display apparatus of the present invention, when seeing the second substrate 2 from above the substrate, two-dimensional distribution of the charged migration particles 5 on a substrate determines a display state of a pixel. This is called a horizontal movement type electrophoretic display apparatus.

Hereafter, this embodiment will be described using FIGS. 1A to 1F. In the following explanation, reference numeral V1 denotes potential of the first electrode and reference numeral V2 denotes potential of the second electrode. In addition, supposing charge polarity of charged migration particles is plus (positive), explanation will be performed. When the charge polarity is minus (negative), what is necessary is just to see reversely the polarities of applied voltages, and magnitude correlation of the applied voltages in the following explanations.

In this embodiment, the common voltage V2=0 V is applied to the second electrodes 7 of all of pixels, and driving is performed by changing the voltage V1 of the first electrode 6. On the contrary, the common voltage V1=0 V is applied to the first electrodes 6 of all the pixels, and driving is performed by changing the voltage V2 of the second electrode 7. In addition, the common voltage applied to the first electrode 6 or the second electrode 7 of all the pixels is not limited to 0 V, and may be an arbitrary voltage.

FIG. 1A illustrates a distribution state of the charged migration particles 5 which is generated when an AC voltage is applied between the first electrode 6 and second electrode 7. When the AC voltage oscillates in a period which is shorter than a time which is required for movement the migration particles 5 to the second electrode 7 from the first electrode 6 or the movement in its reverse direction, the particles cannot reach near by the electrode, and hence, they are widely distributed in the dispersion liquid. This is in the state in FIG. 1A.

Figure 1D:
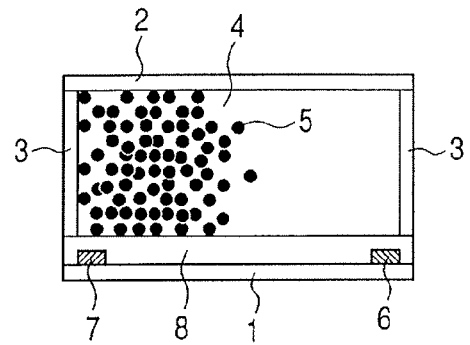
Figure 1B:
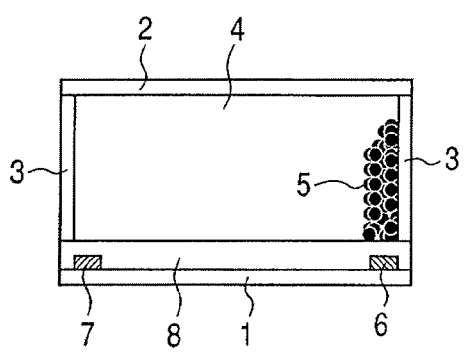
Figure 1E:
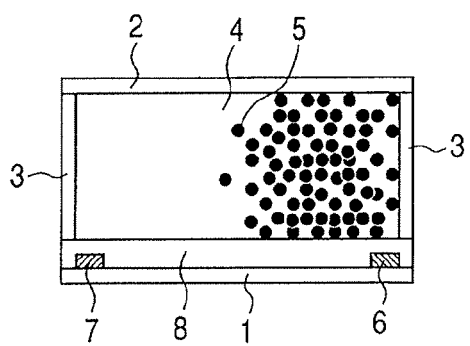
Figure 1C:
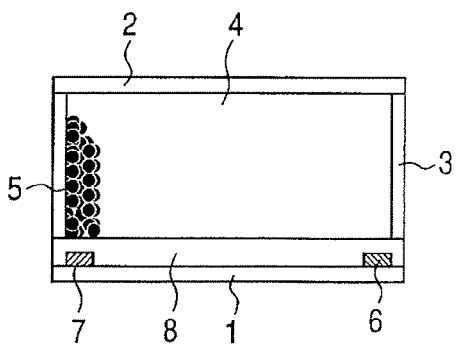
Figure 1F:
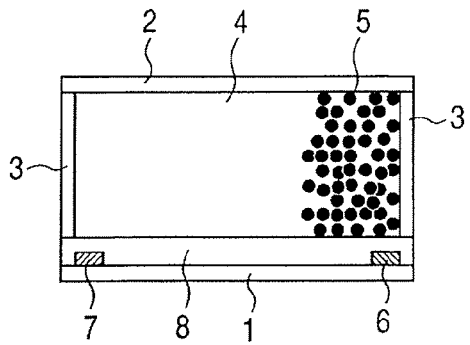

FIGS. 1B and 1C illustrate distribution states of the charged migration particles 5 at the time when a DC voltage is applied between the first electrode 6 and second electrode 7. Depending on polarity of the DC voltage, it becomes in either of a state (FIG. 1B) that the particles 5 gather near the first electrode, or a state (FIG. 1C) that they gather near the second electrode. The particles 5 gather and overlap mutually on a substrate surface with the electrode and a partition surface.

Hereafter, the state in FIG. 1B will be called a first particle distribution state of the charged migration particles 5, and the state in FIG. 1C will be called a second particle distribution state of the charged migration particles 5.

In order to achieve the first particle distribution state, relationship between the potential V1 of the first electrode 6 and the potential of the second electrode 7 is made to become V1<V2. At this time, an electric field arises between the first electrode 6 and second electrode 7, and all the charged migration particles 5 move onto the first electrode 6 altogether after fixed time. This is called a first reset action. At this time, white of the insulating layer 8 is observed from a watcher who observes from the outside (upper part in FIG. 1A) of the second substrate 2, and the pixel becomes white display.

Similarly, the second particle distribution state is formed by applying voltages of V1>V2. When the voltages are applied and fixed time passes, all the particles 5 move onto the second electrode 7 altogether. This is called a second reset action. Also at this time, the pixel becomes white display.

In this embodiment, before displaying a halftone (writing in), a reset operation which makes the charged migration particles 5 the first particle distribution state or second particle distribution state is performed.

Hereafter, a case that the first particle distribution state is formed by a reset operation, and a halftone is subsequently displayed will be considered. First, the above-described first reset operation is performed, and the first particle distribution state is formed. Next, when relationship between the potentials of respective electrodes is made into V1>V2, an electric field arises between the first electrode 6 and second electrode 7, and hence, the charged migration particles 5 start movement toward the second electrode 7.

At this time, the charged migration particles 5 do not move in the same speed all at once, and the charged migration particles 5 which exist on the most upper surface in a state that they are accumulated on the first electrode 6 start movement firstly, and movement is started in order when the charged migration particles 5 which exist under them are exposed on the surface. In addition, since field strength is not uniform even if they start movement at the same time, difference arises also in a moving speed. Consequently, movement of the charged migration particles 5 has ranges temporally and positionally, and a group of the charged migration particles 5 gradually spreads from the first electrode 6 toward the second electrode 7 for the time being from a movement start. When there are sufficiently many charged migration particles 5, even if a top charged migration particle 5 arrives at the second electrode 7, a part is on the first electrode 6 without starting movement yet, and hence, a whole display surface becomes in a state of being covered by the charged migration particles 5. When the movement continues further, all the charged migration particles 5 leave from the first electrode 6, and the group of the charged migration particle 5 is converged on the second electrode 7 after that.

After an apt time lapses before all the charged migration particles 5 have moved onto the second electrode 7, a voltage of the first electrode 6 is set at 0 V. A distribution state of the particles at this time is illustrated in FIG. 1E. At this time, since the white of the insulating layer 8 and the black of the charged migration particles 5 are mixedly observed, the pixel becomes grey display which is a halftone. By modulating an applying time or magnitude of a voltage applied to the first electrode 6, it is possible to display an arbitrary halftone.

It is also possible to perform reset in the second particle distribution state. In this case, when relationship between the potentials of the first and second electrodes is made into V1>V2 after performing the above-described second reset operation to form the second particle distribution state, the charged migration particles 5 start movement toward the first electrode 6. After an apt time lapses before all the charged migration particles 5 have moved onto the first electrode 6, the voltage is set at 0 V. A distribution state at this time is illustrated in FIG. 1D.

In this way, it is possible to change a ratio of an amount of the charged migration particles 5 collected near the first electrode 6 or second electrode 7, and an amount of the charged migration particles 5 dispersed in the transparent liquid 4 by modulating an applying time or magnitude of a voltage, and to display a halftone. By modulating an applying time or magnitude of a voltage, it is possible to display arbitrary halftones as illustrated in FIGS. 1D and 1E.

Although black display of a pixel may be obtained by applying an alternating current to make the state in FIG. 1A, it also possible to achieve it by a method similar to the above-described method of displaying a halftone. That is, what is necessary is just to make the electric field zero in a state that the particles 5 cover the insulating layer 8 completely by making the voltage between the first electrode 6 and second electrode 7 reverse after performing the first reset operation, and migrating the particles 5 from the first electrode 6 toward the second electrode 7. The same operation is possible also from the second reset. It is possible to make this black display state so long as the number of the charged migration particles 5 is sufficient to cover the insulating layer 8 with at least one layer completely.

As shown above, it is possible to form the first particle distribution state of gathering the charged migration particles 5 together on the first electrode 6, the second particle distribution state of gathering the charged migration particles 5 together on the second electrode 7, and further the particle distribution state which is intermediate between these.

The electrophoretic display apparatus in this embodiment forms the half-tone displaying state made from the first particle distribution state and the half-tone displaying state made from the second particle distribution state by turns.

As for odd-numbered halftone display, a distribution state in FIG. 1E in the middle of particles moving toward the second electrode from the first electrode after being reset into the first particle distribution state in FIG. 1B is defined as a halftone display state. As for even-numbered halftone display, a distribution state in FIG. 1D in the middle of particles moving toward the first electrode from the second electrode after being reset into the second particle distribution state in FIG. 1C is defined as a halftone display state.

In this way, when the same halftone display state is written in, at the time of the odd-numbered halftone being written, the charged migration particles 5 are distributed mostly in the first electrode 6 side for the distribution state in FIG. 1E to be made. Then, at the time of the even-numbered halftone being written, the charged migration particles 5 are distributed mostly in the second electrode 7 side for the distribution state in FIG. 1D to be made.

Since these two halftone states seem to be the same brightness although distribution states of the charged migration particle 5 in a pixel are different, when the pixel is observed from the first substrate 1 or the second substrate 2, it seems that the same halftone display is repeated.

When repeating white display, a white display state is made by the first particle distribution state at the time of the odd-numbered white display, and a white display state is made by the second particle distribution state at the time of the even-numbered white display.

In this way, when the two same halftone display states are formed by turns by performing resets by turns into the first particle distribution state and second particle distribution state using the two particle distribution states so as to display one halftone state, it is possible to make a mean value of the applied voltage zero.

In a conventional driving method, when the same display state was repeated many times, an electric field in an identical direction was applied to a dispersion liquid repeatedly, and consequently, the same electric field was formed for a long time, which was stored as a residual DC component. Consequently, there was a problem that, when displaying next, an electric field was given modulation by the residual DC component, and displacement from a desired writing level, that is, display burn-in was generated. Since the residual DC is not stored when this embodiment is applied to this problem, it is effective in burn-in being reduced.

In addition, in a conventional driving method of having only one particle distribution state at the time of displaying a certain halftone, an electric field in an identical direction was applied to a dispersion liquid repeatedly, and consequently, the same electric field was formed for a long time, which was stored as a residual DC component. Consequently, there was a problem that, when performing display next, an electric field was given modulation by the residual DC component, and displacement from a desired writing level, that is, display burn-in was generated. Since the residual DC is not stored when this embodiment is applied to this problem, it is further effective in burn-in being reduced.

Figure 2:
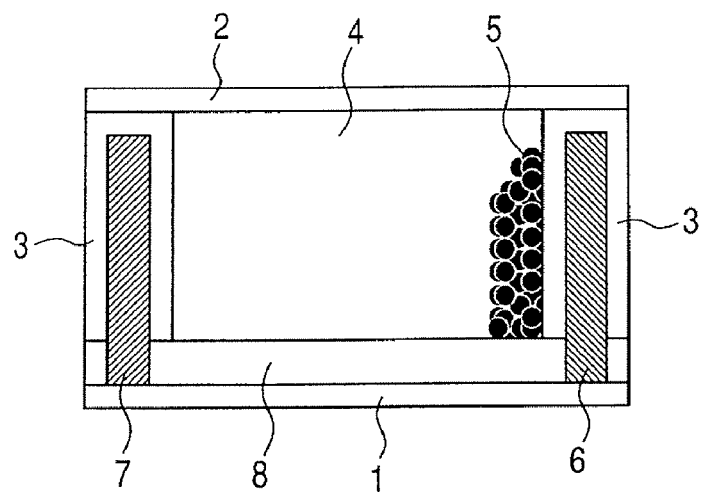
FIG. 2 is an explanatory diagram of structure of a pixel different from that in FIGS. 1A to 1F in the first and second embodiments.

Structure of a pixel and electrodes are not only those illustrated in FIGS. 1A to 1F, but also, as illustrated in FIG. 2, they may be that of having two or more partitions in each pixel, a first electrode and a second electrode being arranged respectively on any two or more of these partitions.

FIGS. 3A to 6B illustrate top views of pixels and electrodes seen from a direction perpendicular to a substrate.

Figure 3A:
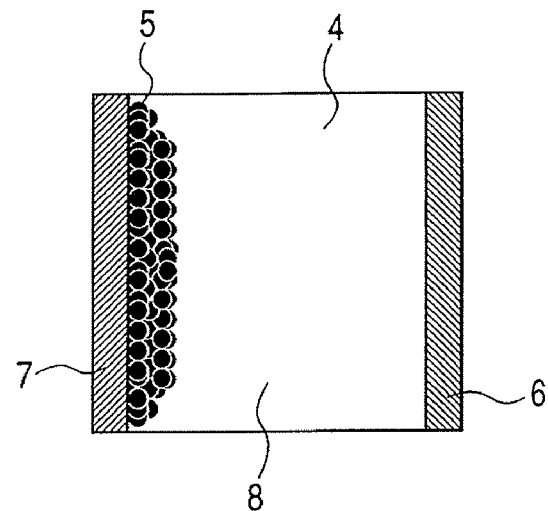
FIGS. 3A and 3B are top views of a pixel of the first and second embodiments.
Figure 3B:
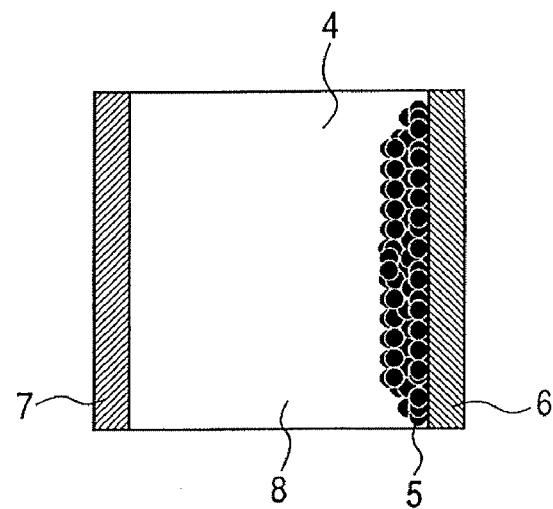

FIGS. 3A and 3B illustrate a pixel in which electrodes are provided in two opposite sides of a square pixel. The first electrode 6 and second electrode 7 are located in both ends of the pixel. An inclusion between them becomes a display surface.

Figure 4A:
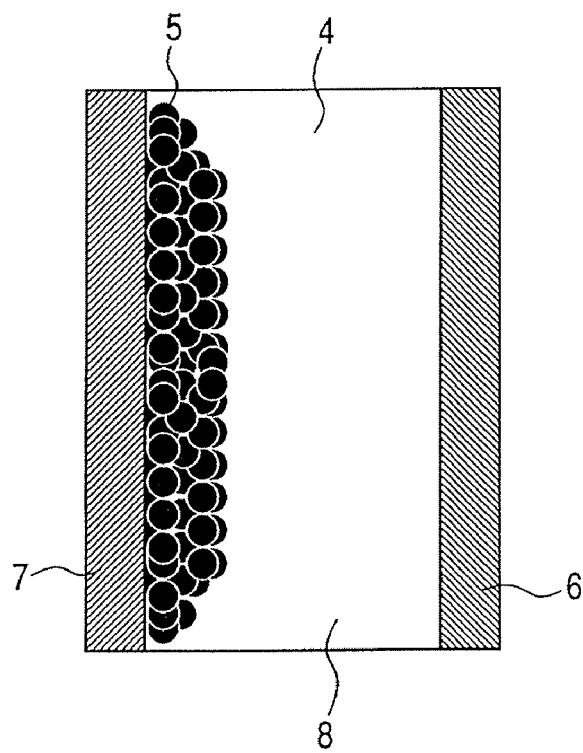
FIGS. 4A and 4B are top views of a pixel different from that in FIGS. 3A and 3B in the first and second embodiments.
Figure 4B:
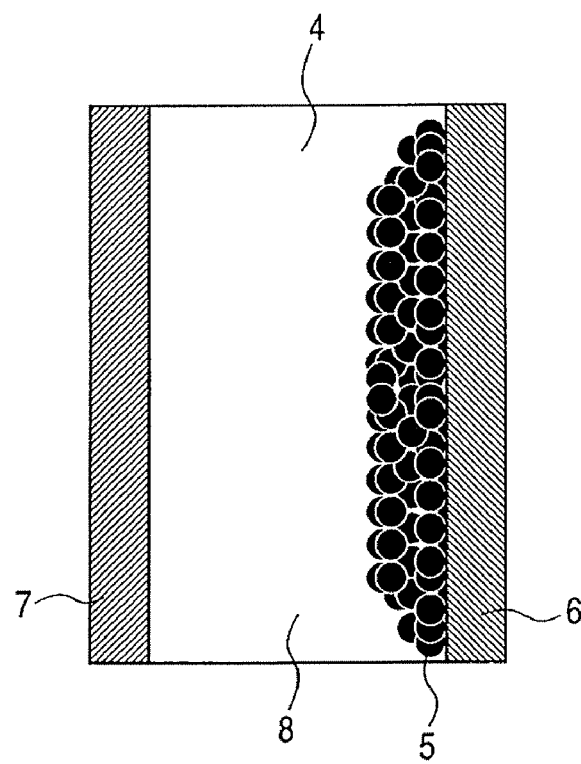

FIGS. 4A and 4B illustrate a structural example that the first electrode 6 and second electrode 7 are provided in parallel to long sides of a rectangular pixel.

Since a distance between electrodes is uniform in the case of electrode arrangement in FIGS. 3A and 3B and FIGS. 4A and 4B, movement of charged migration particles occurs almost uniformly. Hence, voltages which make the first planar distribution state and second planar distribution state in a gradation level same as it can be made in the same magnitude in reversed polarities.

Figure 5A:
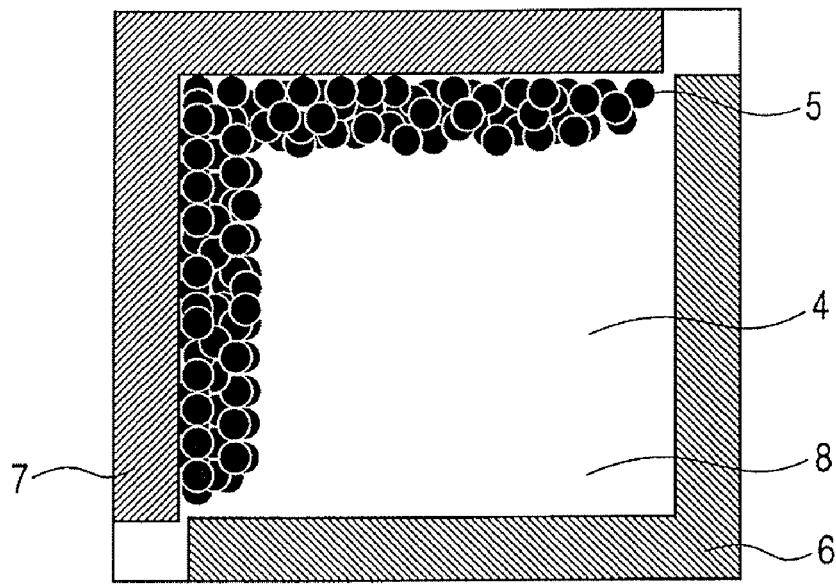
FIGS. 5A and 5B are top views of a pixel further different from that in FIGS. 3A, 3B, 4A and 4B in the first and second embodiments.
Figure 5B:
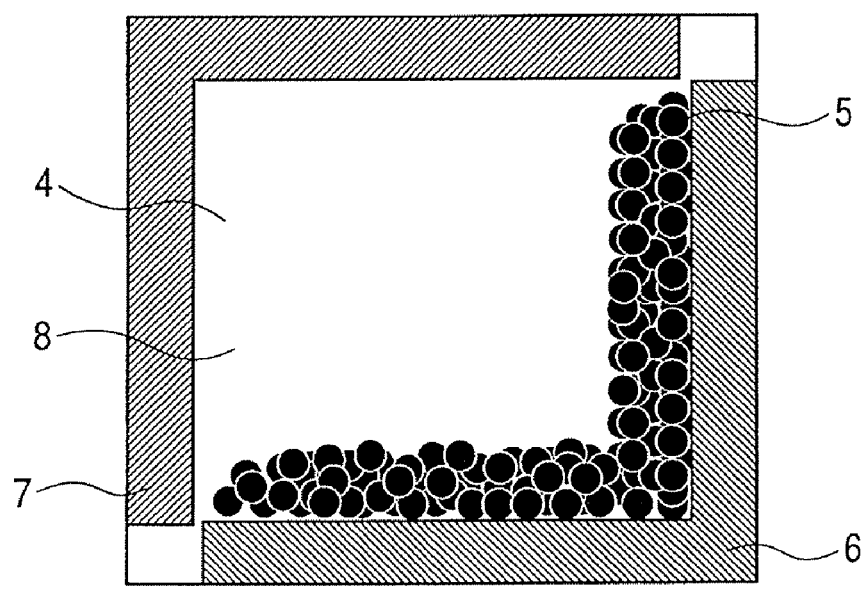

FIGS. 5A and 5B illustrate an example that an L-shaped first electrode is provided in two adjacent sides of a square pixel, and a similar L-shaped second electrode is provided in sides opposite to the sides. It is possible to perform the same arrangement even if a form of a pixel is a rectangle.

Figure 6A:
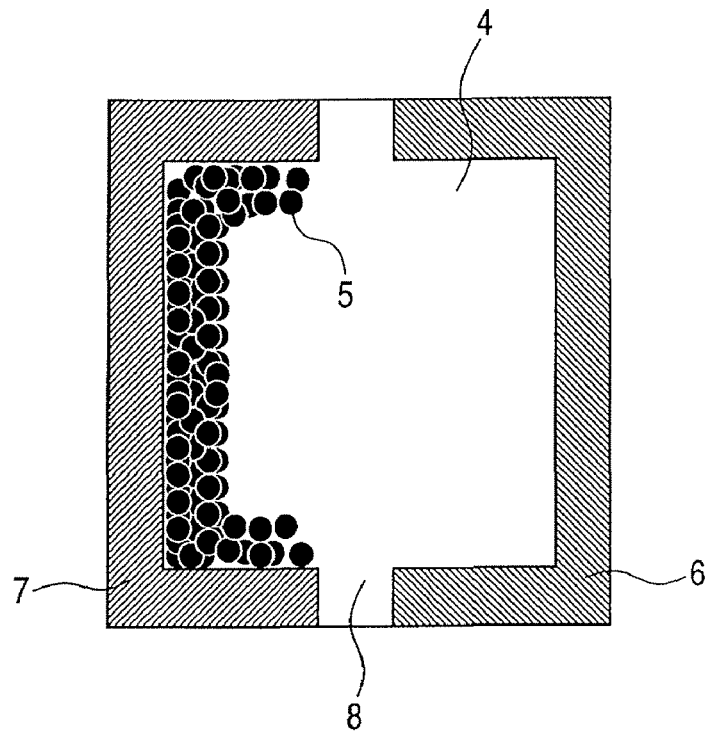
FIGS. 6A and 6B are top views of a pixel still further different in the first and second embodiments.
Figure 6B:
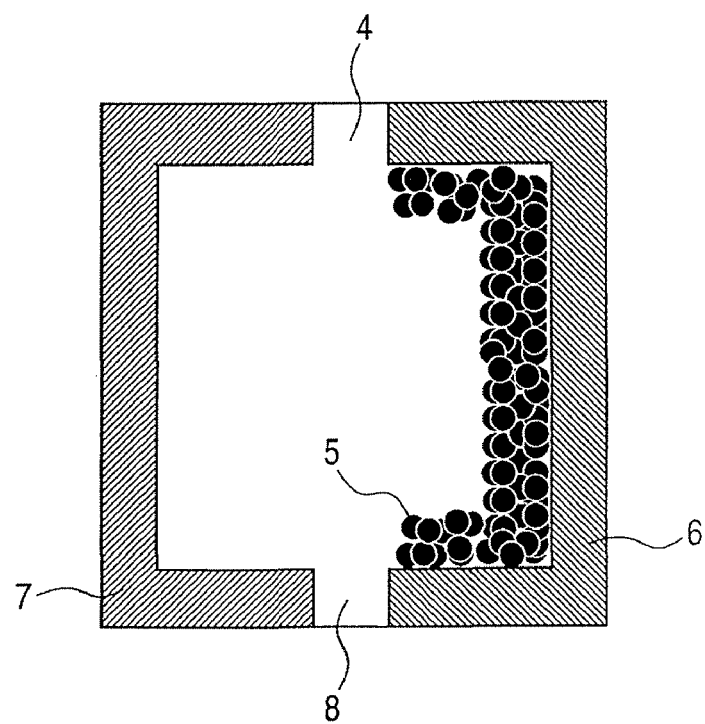

FIGS. 6A and 6B illustrate an example of using U-shaped electrodes in a square pixel (a rectangle one may be also sufficient).

Since an electric field is uneven in the case of FIGS. 5A and 5B or FIGS. 6A and 6B, movement of particles is not uniform. In a portion of a strong electric field, particles move quickly, and they move slowly later in a weak portion. Since an intermediate distribution state becomes one intermediate brightness also in that case, it is possible to use it for gradation display.

As FIG. 3A and 3B to 6, by arranging electrodes in symmetry in end portions of a display surface in view of the display surface, it is possible to make the first planar distribution state which spreads toward the second electrode from the first electrode, and the second planar distribution state which spreads toward the first electrode from the second electrode by voltages with reversed polarities and equal magnitude. By forming them by turns, the applied voltage between the first and second electrodes becomes 0 on average.

When displaying images which change frequently, such as moving images, two consecutive images are not necessarily the same brightness. At that time, a first distribution state and a second planar distribution state which follows it need voltages having different magnitude. Therefore, an average voltage does not become 0 strictly. However, averaging to some extent is performed since voltage polarity changes by turns.

Embodiment 2

In the above-described first embodiment, resetting is performed before performing next writing. On the other hand, in this embodiment, it is made to perform direct transition into next each state from each state of black display, white display, and halftone display without resetting before writing.

Hereafter, with reference to FIGS. 1A to 1F, a driving method of this embodiment will be described similarly to the first embodiment.

Similarly to the first embodiment, the second substrate 2 is transparent, the insulating layer 8 is colored in white, and black charged migration particles 5 positively charged should be used. In addition, when describing this embodiment, explanation will be performed using driving of applying a common voltage 0 V to the second electrodes 7 of all the pixels, and changing a voltage of the first electrode 6. Driving of applying a common voltage 0 V to the first electrodes 6 of all the pixels, and changing a voltage of the second electrode 7 is also conceivable. In addition, the common voltage applied to the first electrode 6 or the second electrode 7 of all the pixels is not limited to 0 V, and may be also a voltage having an arbitrary voltage value. Although charge polarity of the charged migration particles 5 may be any of positive and negative ones, with taking a case that charge polarity is positive as an example, explanation will be advanced hereafter. Structure of a pixel and electrodes is not only that illustrated in FIGS. 1A to 1F, but also, as illustrated in FIG. 2, it may be that of having two or more partitions in each pixel, a first electrode and a second electrode being arranged respectively on any two or more of these partitions. In addition, as for structure of a pixel and electrodes, in addition to those illustrated in FIGS. 1A to 1F and FIG. 2, those illustrated in top views illustrated in FIGS. 3A and 3B, FIGS. 4A and 4B, FIGS. 5A and 5B, and FIGS. 6A and 6B respectively, or those obtained by combining them are conceivable.

In this embodiment, a method of white display of a pixel is the same as that of the first embodiment, and it is performed by the charged migration particles 5 forming the first distribution state of particles gathering to the first electrode 6, or the second distribution state of gathering to the second electrode 7.

Next, a method of halftone display of a pixel is performed directly without through resetting. For example, when moving from a halftone illustrated in FIG. 1D to a halftone illustrated in FIG. 1E, it is set as V1<V2 to generate a rightward electric field between the first electrode 6 and second electrode 7, and when reaching the state in FIG. 1E, it is set as V1=V2. On the contrary, when moving from a halftone illustrated in FIG. 1E to a halftone illustrated in FIG. 1D, it is set as V1>V2 to generate a leftward electric field between the first electrode 6 and second electrode 7, and when reaching the state illustrated in FIG. 1D, it is set as V1=V2. Halftone display is possible as mentioned above. At this time, when the rightward electric field and leftward electric field are applied in the same magnitude for the same time, it is possible to make aspects in FIGS. 1D and 1E into halftones in the same brightness.

In addition, black display of a pixel can be achieved by a method similar to the method of displaying a halftone. That is, when generating an electric field between the first electrode 6 and second electrode 7, as illustrated in FIG. 1A, making the electric field between the first electrode 6 and second electrode 7 into zero in a state that the charged migration particles 5 cover the insulating layer 8 mostly, a pixel is observed as black display.

Since a reset operation such as once performing white display is not followed, this embodiment has an advantage that display is accelerable.

Also in this embodiment, similarly to the first embodiment, it is made to have two or more particle distribution states for achieving one halftone. That is, many charged migration particles 5 are made to be distributed in the first electrode 6 side as illustrated in FIG. 1E at the time of odd-numbered halftone writing, and many charged migration particles 5 are made to be distributed in the second electrode 7 side as illustrated in FIG. 1D at the time of even-numbered halftone writing. When displaying halftones at the same level, the charged migration particles 5 shuttle by turns between the optically same distribution states as illustrated in FIGS. 1D and 1E, without through resetting. Similarly to the above-mentioned first embodiment, since the residual DC is not stored, there is an effect that burn-in is reduced.

By the way, when writing from a halftone state to a halftone state is repeated by the driving method shown in this embodiment, distribution of particles may exist unevenly in a pixel. In such a case, as a refresh operation, an operation of gathering the charged migration particles 5 together to the first electrode 6 to form the first particle distribution state, or an operation of gathering the charged migration particles 5 together to the second electrode 7 to form the second particle distribution state is made to be performed intermittently.

At this time, refreshment is performed by turns as refreshment is performed in the first particle distribution state at the time of odd-numbered refreshment, and refreshment is performed in the second particle distribution state at the time of even-numbered refreshment. Using this method, in comparison with a conventional driving method, since the residual DC is not stored, there is an effect that burn-in is reduced.

In addition, in order to determine timing of performing a refresh operation, memory (not illustrated) which leaves a drive history, and a reference table (not illustrated) storing a driving waveform which corresponds to the drive history and should be applied may be provided in a display unit. In this case, the drive history provided from a driver etc. is written in the memory. A refresh operation is performed at the time of becoming clear that it reaches at the time of needing the refresh operation by referring to the driving waveform, which corresponds to the drive history and should be applied, from the reference table.

By the way, when resetting is not mediated like this embodiment, a voltage value and an applying time of a voltage for achieving a halftone state are not decided uniquely. That is, depending on a displaying state of a pixel before writing a halftone state, a voltage value of a voltage to be applied, and an applying time of the voltage change.

Then, memory which leaves a drive history, and a reference table which stores a driving waveform which corresponds to a drive history and should be applied may be provided in a display unit. In this case, in order to write a desired gradation, based on the reference table, a voltage value and an applying time of a voltage for writing the desired gradation corresponding to the application history are determined.

Embodiment 3

FIGS. 7A to 7E illustrate an electrophoretic display apparatus of this embodiment. These drawings illustrate vertical sectional views of one pixel. With reference to these drawings, the display unit of this embodiment will be described by one pixel.

This embodiment is characterized by sticking the charged migration particles 5 on the first substrate 1 side or second substrate 2 side at the time of writing.

Figure 7A:
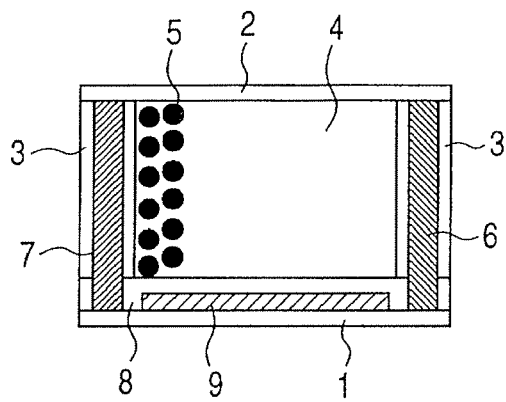
FIGS. 7A, 7B, 7C, 7D, and 7E are explanatory diagrams of an electrophoretic display apparatus according to a third embodiment.

In the electrophoretic display apparatus of this embodiment, the first electrode 6 is arranged on the partition 3 in a right-hand side in FIG. 7A, and the second electrode 7 is arranged in a left-hand side partition. In addition, on the first substrate 1, a third electrode 9 is arranged and this third electrode 9 is covered with the insulating layer 8. In addition, other structure is the same as that illustrated in FIG. 2.

Figure 7D:
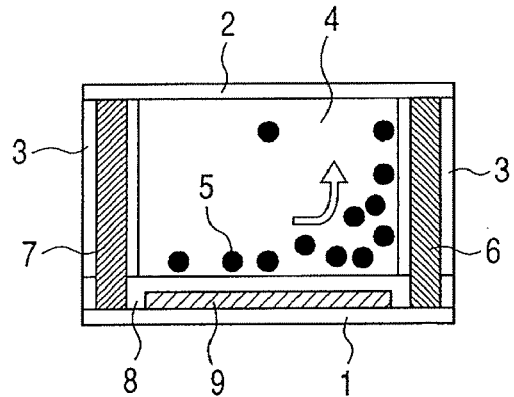
Figure 7B:
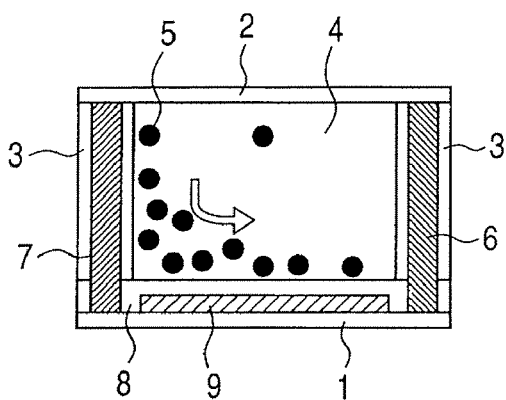
Figure 12:
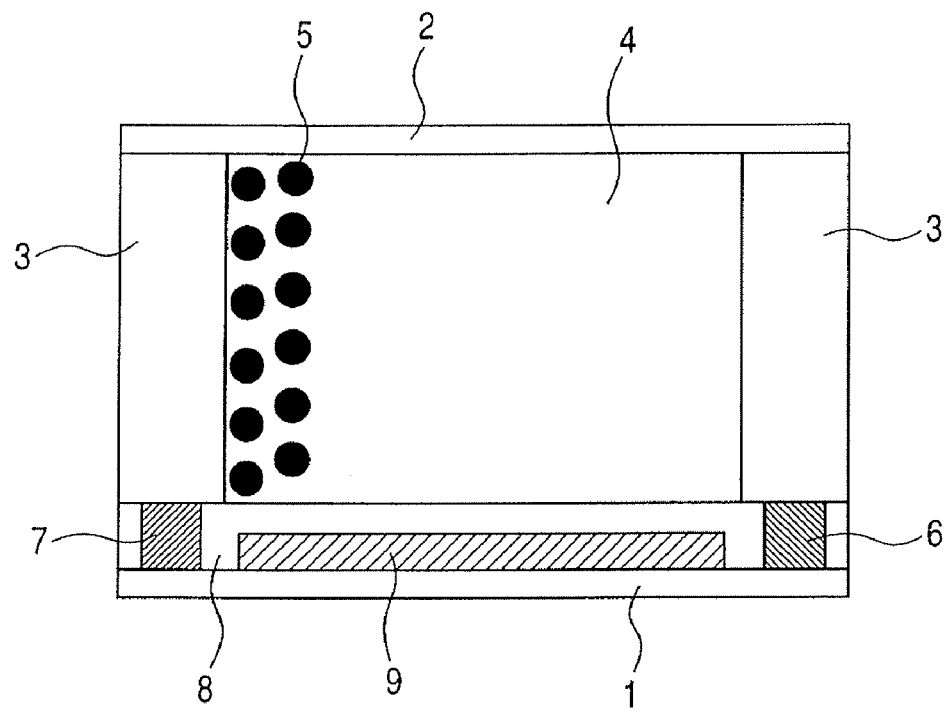
FIG. 12 is a sectional view illustrating another structure of a pixel of the electrophoretic display apparatus of the third embodiment.
Figure 13:
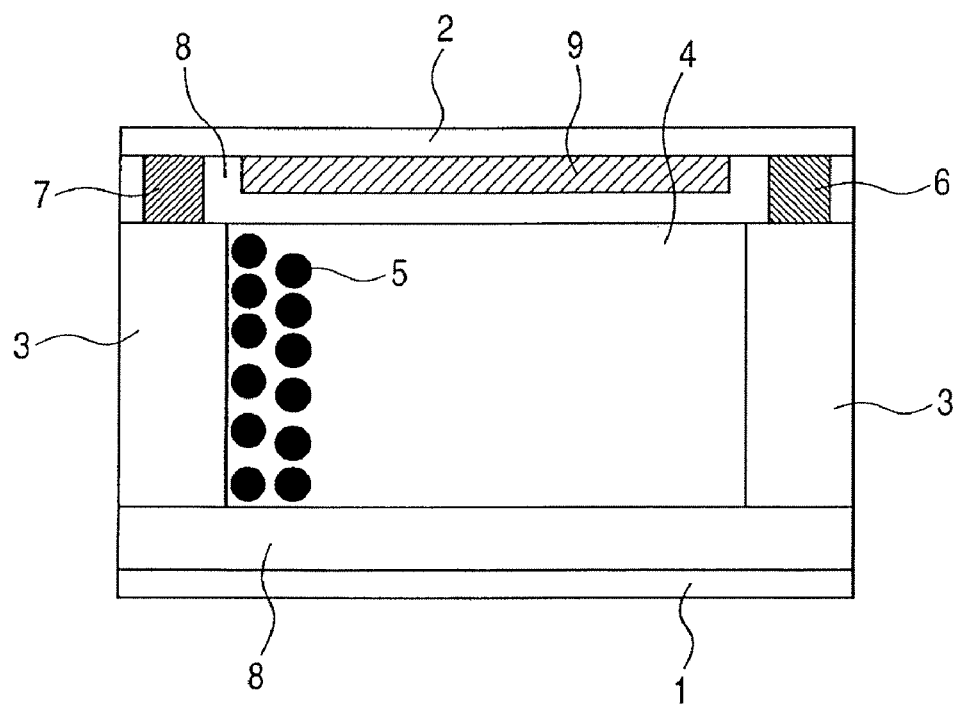
FIG. 13 is a sectional view illustrating still another structure of a pixel of the electrophoretic display apparatus of the third embodiment.
Figure 14:
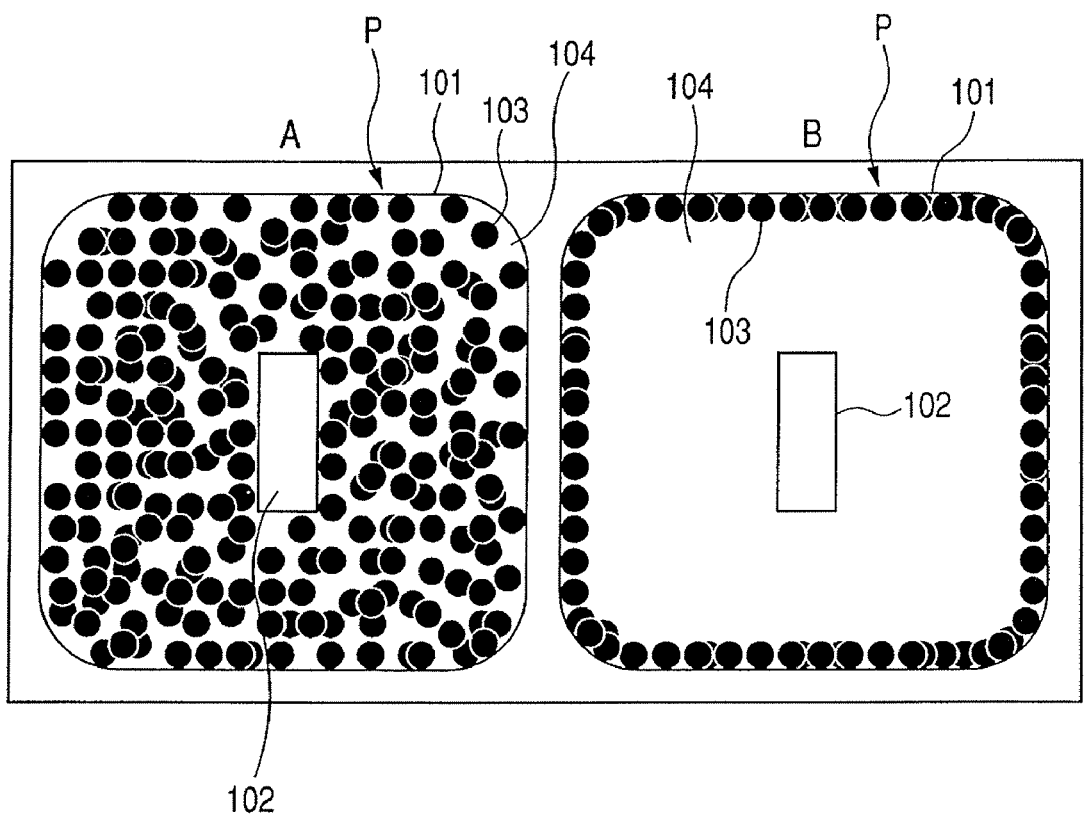
FIG. 14 is a top view for describing a dark state and a bright state of a pixel of a conventional electrophoretic display apparatus.

As illustrated in FIGS. 7A and 7B, the third electrode 9 is arranged on the first substrate 1 to approach the charged migration particles 5 in the first substrate 1 side, or the charged migration particles 5 are kept away from the first substrate 1 side to draw the charged migration particles 5 near to the second substrate 2 side. In this embodiment, supposing charge polarity of the charged migration particles 5 is positive, and the charged migration particles 5 are drawn near to the third electrode 9 side arranged at the first substrate 1 at the time of writing, explanation will be advanced. However, the charge polarity of charged migration particles 5 may be negative, and in that case, what is necessary is just to see reversely the polarity of applied voltages, and magnitude correlation of the applied voltages in the following explanations. Alternately, the particles may be also drawn near to the second substrate 2 side. Furthermore, as illustrated in FIG. 8, the third electrode 9 may be arranged in the second substrate 2 side, and also in this case, the particles may be drawn near to the first substrate 1 side, or the particles may be also drawn near to the second substrate 2 side. In addition, as for structure of a pixel and electrodes, not only that illustrated in FIGS. 7A to 7E, and FIG. 8, but also, for example, those illustrated in FIG. 12 and FIG. 13 are sufficient.

Hereafter, explanation will be advanced with reference to FIGS. 7A to 7E, and 8. Any one of the first electrode 6, second electrode 7, and third electrode 9 which are illustrated in these drawings is an electrode to which a voltage common to all the pixels is applied, and other two are electrodes which are connected to switching devices such as TFTS, and to which voltages can be applied actively.

Figure 11A:
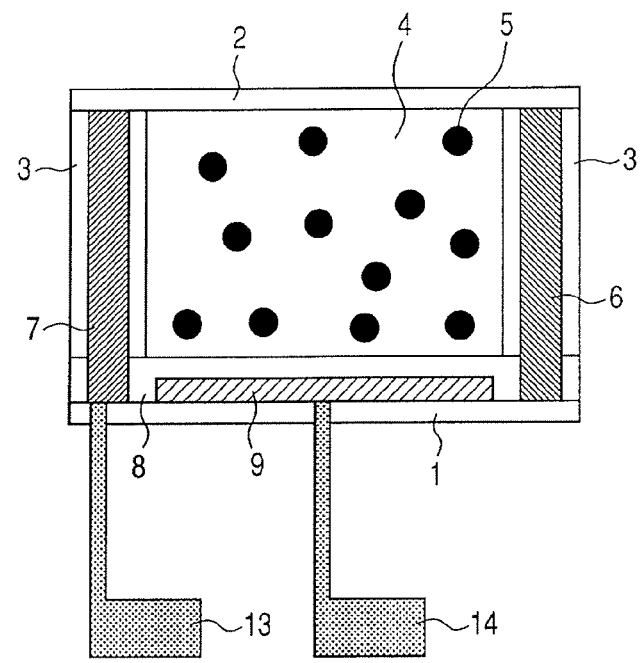
FIG. 11A is a sectional view illustrating that a first electrode is a common electrode, and a second electrode and a third electrode are electrodes to which voltages can be applied independently.
Figure 11B:
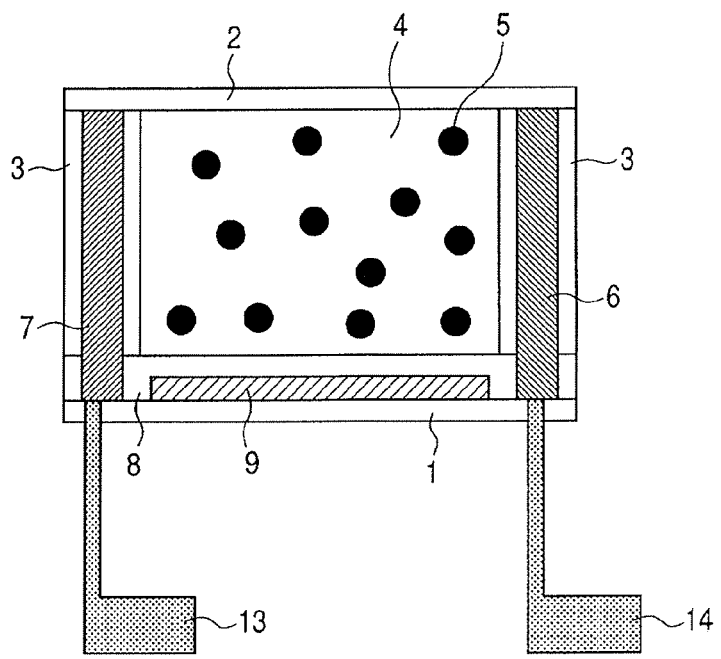
FIG. 11B is a sectional view illustrating that a third electrode is a common electrode, and a first electrode and a second electrode are electrodes to which voltages can be applied independently.

FIGS. 11A and 11B are drawings illustrating cross-sections of pixels at the time of driving each electrode using an active device.

FIG. 11A illustrates an example that a first TFT 13 is connected to the second electrode 7, and a second TFT 14 is connected to the third electrode 9, voltages are independently set respectively, and the first electrode 6 is used as a common electrode.

FIG. 11B illustrates an example that the first TFT is connected to the second electrode 7, and the second TFT 14 is connected to the first electrode 6 and is driven independently, and the third electrode 9 is used as a common electrode. In this embodiment, active devices are connected as illustrated in FIG. 11B.

Figure 7E:
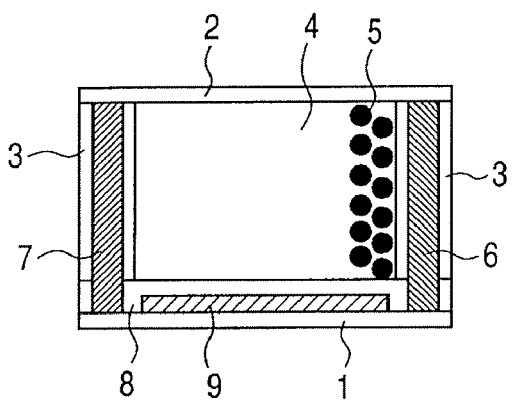
Figure 7C:
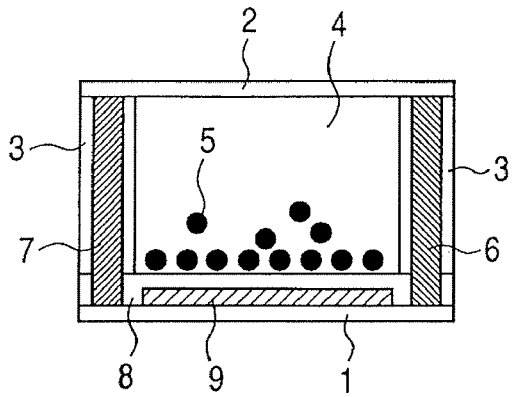
Figure 8:
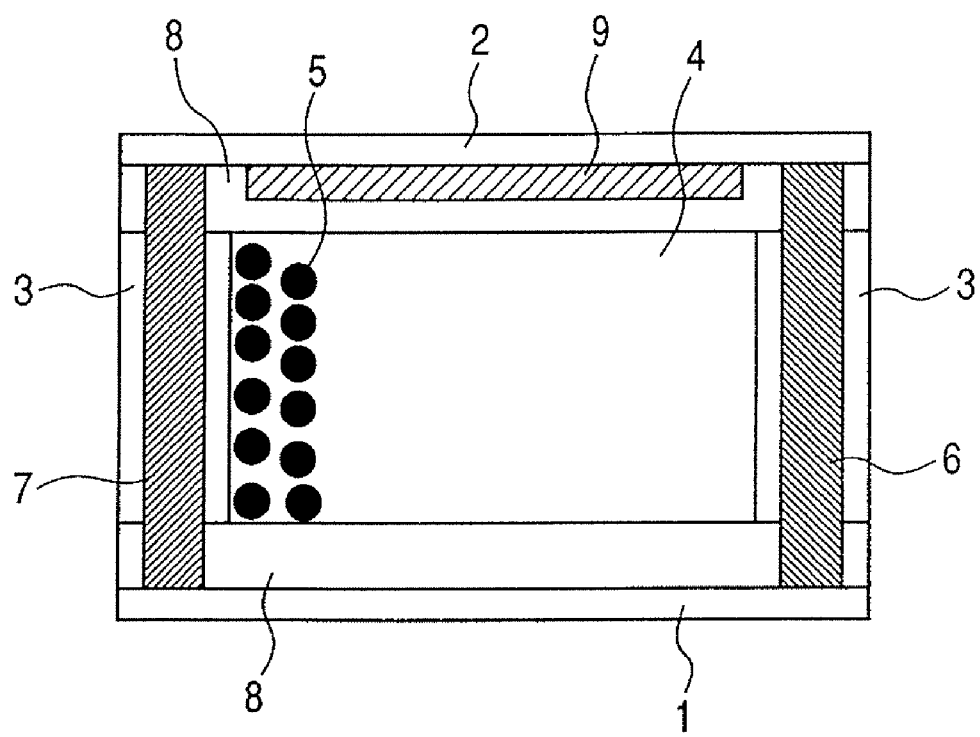
FIG. 8 is a sectional view for describing structure of a pixel different from that in FIGS. 7A to 7E in the third embodiment.

FIGS. 7A to 7E illustrate one displaying state, respectively. FIG. 7A illustrates a "white" display state, FIG. 7B illustrates a halftone display state, FIG. 7C illustrates a "black" display state, FIG. 7D illustrates a halftone display state same as that in FIG. 7B, and FIG. 7E illustrates another "white" display state.

FIGS. 7A and 7E illustrate a state (hereafter, this is called a reset state) that the charged migration particles 5 are gathered around the first electrode 6 or the second electrode 7 substantially altogether, and a pixel is observed as white display. An observer observes white of the insulating layer 8.

A method at the time of performing halftone display and black display of a pixel from the reset state in FIG. 7A will be illustrated. When it is in the state illustrated in FIG. 7A, relationship among potentials of respective electrodes is set as V2>V3>V1. At this time, a direction of an electric field goes to the first electrode 6 through the third electrode 9 from the second electrode 7, or goes directly to the first electrode 6 from the second electrode 7. Although the charged migration particles 5 start to move toward the first electrode 6, since a most proximal section of the second electrode 7 and third electrode 9 has strong electric field strength, they move as illustrated in FIG. 7B with being drawn near to the first substrate 1 side of the pixel. What is necessary is just to make voltages into V2=V3=V1 after reaching a desired halftone display state. Alternatively, by making them into V3<V1=V2, all the charged migration particles 5 are made to stick on the third electrode 9. In addition, it is possible to display a halftone by modulating an applying time or magnitude of voltages. In addition, in order to achieve a black display state in FIG. 7C, what is necessary is just to make voltages into V2=V3=V1 or V3<V1=V2 when the charged migration particles 5 cover up the pixel mostly.

When performing halftone display and black display from the reset state in FIG. 7E, it is possible to perform them similarly by making voltages into V2<V3<V1. At this time, in order to obtain a halftone same as the halftone state of starting from FIG. 7A, what is necessary is that an electric field has a reverse direction, the same amplitude, and the same applying time.

In order to change a state to the reset state in FIG. 7E from the halftone display state or a black display state which are illustrated in FIGS. 7B, 7C, and 7D, relationship among the potentials of respective electrodes is made into V2>V3>V1. A direction of an electric field goes to the first electrode 6 through the third electrode 9 from the second electrode 7, or goes directly to the first electrode 6 from the second electrode 7. The charged migration particles 5 moves toward the first electrode 6 with being drawn near to the first substrate 1 side of the pixel as illustrated in FIG. 7D. When the charged migration particles 5 fully finish movement to the first electrode 6, it becomes in the reset state in FIG. 7E. Since the electric field at this time is made stronger enough than the case of making a halftone or is made to be applied for sufficiently long time, even if a starting condition is any of FIGS. 7B, 7C, and 7D, it is good at fixed electric field strength and fixed applying time.

In order to obtain the reset state in FIG. 7A, what is necessary is just to apply an electric field with a reverse direction, the same applying time, and the same electric field strength.

As mentioned above, although the case of the charge polarity of the charged migration particles being positive has been described, the charge polarity of the charged migration particles may be also negative. At that time, what is necessary is just to make the polarity of the above-described applied voltages, and magnitude correlation of the applied voltages reverse.

It is possible to make a voltage mean zero by repeating by turns operations of performing one side of resetting before writing and making an intermediate state and a black state which start from it, and succeedingly performing another side of resetting and making the intermediate state and black state which start from it.

In this embodiment, the third electrode 9 has potential common to all the pixels, and 0 V is conceivable as its value, but the present invention is not limited to it.

As mentioned above, in this embodiment, the driving method of sticking the charged migration particles 5 on the first substrate 1 or the second substrate 2 at the time of writing using three electrodes 6, that is, the first electrode 6, second electrode 7, and third electrode 9 is shown. Even when particles are stuck on any substrate, with using the driving method in this embodiment, a flow occurs in a dispersion liquid in a pixel, and hence, the charged migration particles 5 move also at the time of no voltage being applies. Or, it is possible to avoid a problem that viscosity of the transparent liquid 4 is not sufficient, and hence, the charged migration particles 5 performs inertia motion even after setting the voltage of all the electrodes at 0 V, or the charged migration particles 5 move by an inverse electric field etc.

Embodiment 4

FIGS. 9A to 9J illustrate an electrophoretic display apparatus of this embodiment. These drawings illustrate vertical sectional views of one pixel. With reference to these drawings, the display unit of this embodiment will be described by one pixel.

Supposing charge polarity of charged migration particles is positive, explanation will be performed.

As to structure of a pixel in this embodiment, the third electrode 9 is arranged on the second substrate 2, and a fourth electrode 10 is arranged on the first substrate 1. Other structure of the pixel is the same as that in the above-described third embodiment. Any two among four electrodes of the first electrode 6, second electrode 7, third electrode 9, and fourth electrode 10 are electrodes to each of which a voltage common to all the pixels is applied, and other two are electrodes which are connected to switching devices such as TFTS, and to which voltages can be applied actively.

The third electrode 9 and fourth electrode 10 are made common electrodes respectively, and potential is set at 0 V. The 1st electrode 6 and second electrode 7 are made driving electrodes.

Figure 9A:
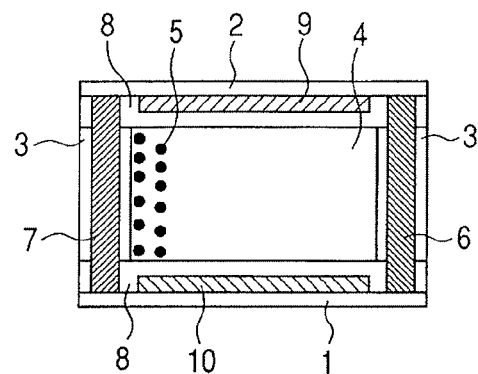
FIGS. 9A, 9B, 9C, 9D, 9E, 9G, 9F, 9H, 9I and 9J are sectional diagrams for describing an electrophoretic display apparatus according to fourth and fifth embodiments.
Figure 9D:
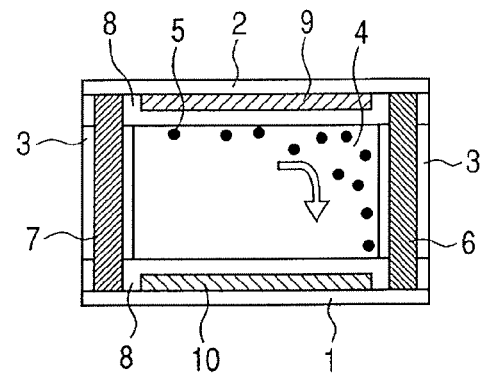
Figure 9B:
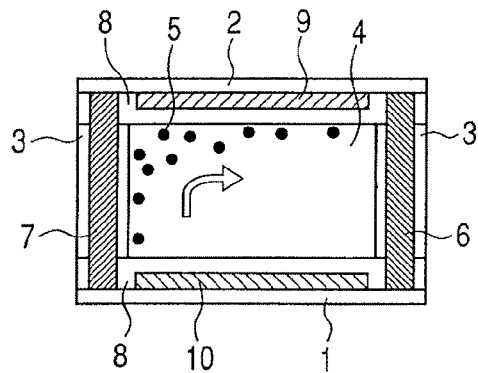
Figure 9E:
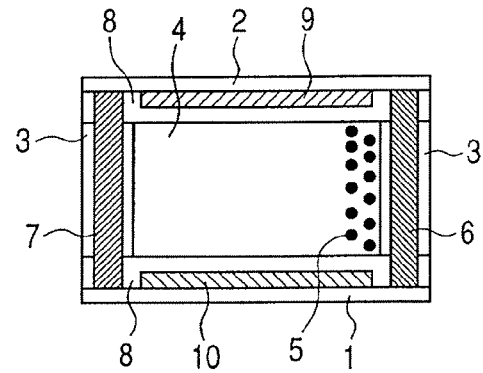
Figure 9C:
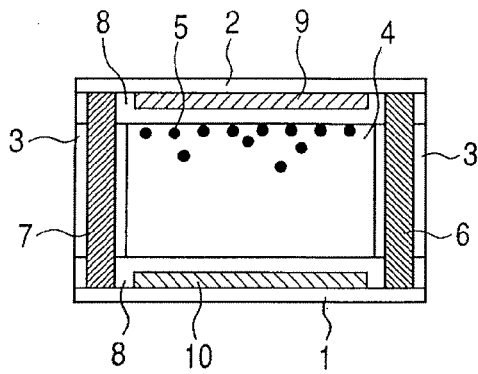
Figure 9F:
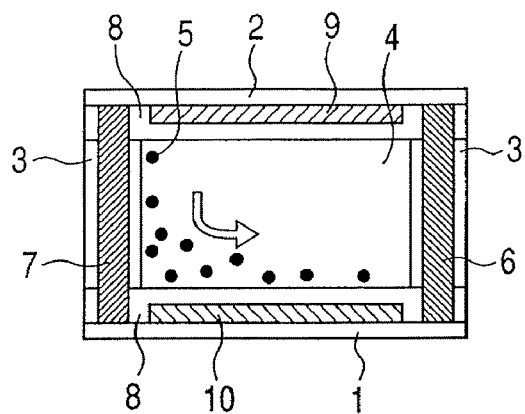
Figure 9I:
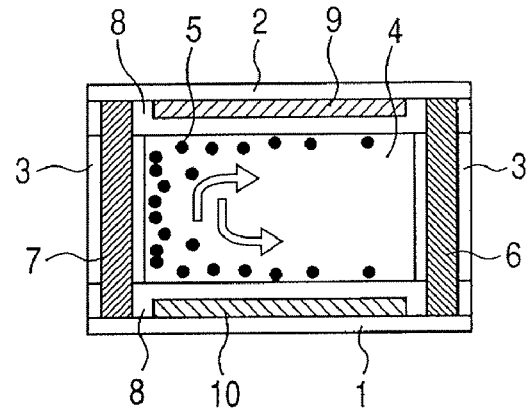
Figure 9G:
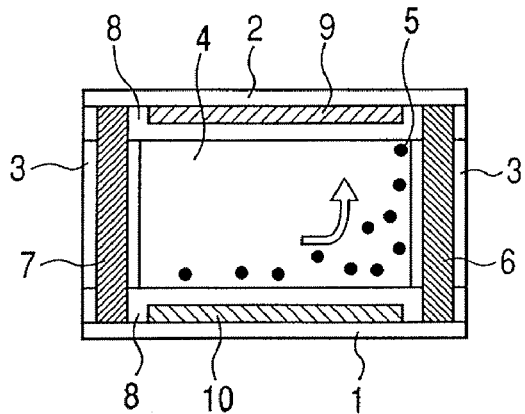

FIGS. 9A to 9J illustrate one displaying state, respectively. FIG. 9A illustrates a "white" display state, FIG. 9B illustrates a halftone display state, FIG. 9C illustrates a "black" display state, FIG. 9D illustrates a halftone display state same as that in FIG. 9B, FIG. 9E illustrates another "white" display state, and FIG. 9F illustrates a halftone display state same as those in FIGS. 9B and 9D. In addition, FIG. 9G illustrates a halftone display state same as those in FIGS. 9B, 9D, and 9F, FIG. 9H illustrates a halftone display state same as those in FIGS. 9B, 9D, 9F, and 9G, FIG. 9I illustrates a halftone display state same as those in FIGS. 9B, 9D, 9F, 9G, and 9H, and FIG. 9J illustrates a "black" display state.

FIGS. 9A and 9E illustrate a reset state. An observer observes white of the insulating layer 8.

In order to form the reset state in FIG. 9A, relationship among potentials of respective electrodes is made into V2<V3=V4<V1 or V2<V3=V4=V1, and after the charged migration particles 5 fully move to the second electrode 7 side, it is made into V1=V2=V3=V4. Since it becomes in the reset state so long as sufficient electric field strength or applying time is given regardless of an original state, the voltage and applying time for resetting may be constant.

Next, when the voltages are made into V1<V3=V4<V2 from the reset state illustrated in FIG. 9A, an electric field going to the first electrode 6 through the third electrode 9 from the second electrode 7, going to the first electrode 6 through the fourth electrode 10 from the second electrode 7, or going to the first electrode 6 directly from the second electrode 7 occurs.

Although the charged migration particles 5 start to move toward the first electrode 6, since a most proximal section of the second electrode 7 and third electrode 9, and a most proximal section of the second electrode 7 and fourth electrode 10 have strong electric field strength, they move as illustrated in FIG. 9I with being drawn near to the second substrate 2 side and first substrate 1 side. Voltages are made into V1=V2=V3=V4 after reaching a desired halftone display state.

It is possible to display a halftone by modulating the applying time or magnitude of a voltage. In addition, in order to achieve a black display state, voltages are made into V1=V2=V3=V4 when the charged migration particles 5 cover up the pixel most.

Figure 9J:
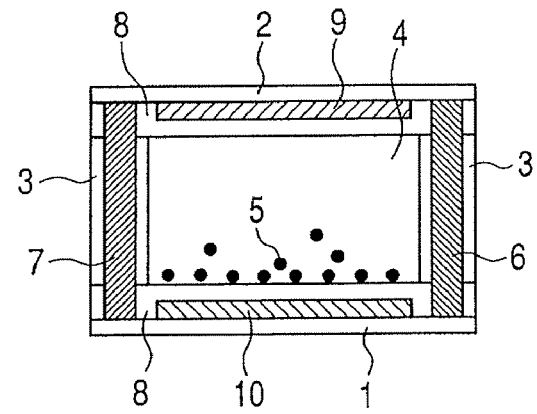
Figure 9H:
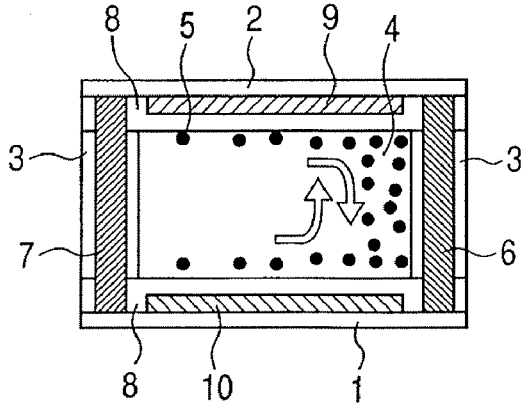

It is also sufficient to make relationship of V4>V1=V2>V3 hold in the electrodes of all the pixels after all the pixels reach a desired halftone display state or a desired black display state, and to stick the charged migration particles 5 in the second substrate 2 side of each pixel as illustrated in FIG. 9C. Alternatively, it is also sufficient to make relationship of V3>V1=V2>V4 hold, and to stick the charged migration particles 5 in the first substrate 1 side of each pixel as illustrated in FIG. 9J.

In order to perform halftone display and black display of a pixel from the reset state in FIG. 9E, when voltages are made into V2<V3=V4<V1, it is possible to reach a desired halftone display state or a desired black display state. Strength and applying time of each electric field at this time are made into a reverse direction, the same strength, and the same applying time to those at the time of starting from FIG. 9A and obtaining a halftone display. Thereby, it is possible to obtain the same halftone level.

It is possible to make a voltage mean zero by repeating by turns operations of performing resetting in FIG. 9A and making an intermediate state and a black state which start from it, and succeedingly performing resetting in FIG. 9E and making the intermediate state and black state which start from it.

In a matrix display unit, the third electrode 9 and fourth electrode 10 may be electrodes common to all the pixels, and each may be a stripe electrode per line.

When the driving method in this embodiment is used, it is possible to avoid a problem that the charged migration particles 5 move also at the time of no voltage being applied since a flow occurs in a dispersion liquid in a pixel, a problem that viscosity of the transparent liquid 4 is not sufficient, and hence, the charged migration particles 5 performs inertia motion even after setting the voltage of all the electrodes at 0 V, a problem that the charged migration particles 5 move by an inverse electric field, or the like. In addition, the driving method in this embodiment is particularly effective as means of controlling the charged migration particles 5 which float in the transparent liquid 4.

Embodiment 5

The fourth embodiment shows the charged migration particles 5 are made to move with sticking them on the first substrate 1 and second substrate 2.

This embodiment performs by turns two modes of a mode of moving the charged migration particles 5 with sticking them on the first substrate 1, and a mode of moving them with sticking them on the second substrate 2. The second substrate 2 is transparent, the insulating layer 8 is colored in white, and black charged migration particles 5 positively charged shall be used. Since others are the same as those in the fourth embodiment, this will be described hereafter using FIGS. 9A to 9J.

A method of making the reset states in FIGS. 9A and 9E is the same as that in the fourth embodiment.

The first mode, that is, a case of moving the charged migration particles 5 with sticking them on the first substrate 1 with the fourth electrode 10 will be described below.

When the charged migration particles 5 are in a distribution state illustrated in FIG. 9A, when voltages in relationship of V3>V2>V4>V1 are given to respective electrodes, although the charged migration particles 5 start to move toward the first electrode 6, potential of the third electrode 9 is high and potential of the fourth electrode 10 is low in view of the second electrode, and hence, the particles move so as to stick to the fourth electrode 10 (FIG. 9F).

By making voltages into V3>V1=V2>V4 after the charged migration particles 5 reach a desired halftone display state as illustrated in FIG. 9J, not only movement of the charged migration particles 5 toward the first electrode is stopped, but also such an electric field that pushes them to the fourth electrode is maintained. It is possible to display a halftone by modulating the applying time or magnitude of a voltage. In order to achieve a black display state, what is necessary is just to make voltages into V1=V2=V3=V4 or V3>V1=V2>V4 when the charged migration particles 5 cover up the pixel most.

When performing halftone display and black display from the reset state in FIG. 9E, voltages of V1 and V2 are exchanged without changing the voltages of V3 and V4. At this time, because of V3>V1>V4>V2, the migration particles 5 move toward the second electrode as sticking to the fourth electrode from the first electrode. Voltages are made into V3>V1=V2>V4 after reaching the desired halftone display state and black display state.

Next, the second mode, that is, a mode of moving the charged migration particles 5 with sticking them on the second substrate 2 with the third electrode 9 will be described.

When being in the reset state illustrated in FIG. 9A, voltages having relationship of V4>V2>V3>V1 where V3 and V4 in the first mode are exchanged are applied to respective electrodes. Supposing the halftone with brightness same as that in the first mode is made, voltages of V1 and V2 are made the same as those in the first mode.

Although the charged migration particles 5 start to move toward the first electrode 6, since the third electrode 9 has low potential and the fourth electrode 10 has high potential in view of the second electrode 6, the charged migration particles 5 move as sticking to the second substrate 2 with the third electrode 9 (FIG. 9B). After the charged migration particles 5 reach a desired halftone display state as illustrated in FIG. 9C, the particles are stopped by making voltages into V4>V1=V2>V3. At this time, since such an electric field that pushes them on the second substrate 2 is maintained, it is possible to stabilize display. It is possible to display a halftone by modulating the applying time or magnitude of a voltage. In addition, in order to achieve a black display state, voltages are made into V4>V1=V2>V3 when the charged migration particles 5 cover up the pixel most.

When performing halftone display and black display of the pixel from the reset state in FIG. 9E, voltages of V1 and V2 are exchanged with keeping V3 and V4 as they are. At this time, because of V4>V1>V3>V2, the particles near the first electrode 6 move toward the second electrode 7 as sticking to the second substrate 2 with the third electrode 9. Voltages are made into V3>V1=V2>V4 after reaching the desired halftone display state and black display state.

In this embodiment, displays which start from two reset states are performed in the first mode by turns, and then, displays which start from two reset states are performed in the second mode by turns by the number of times same as that of the first mode. Thereby, an average voltage at the time of continuing to display the same halftone level becomes 0. Also when changing such as moving images, since polarities interchanges by turns, accumulation of electric charges decreases.

In this embodiment, since potential difference is always given between the third electrode 9 and fourth electrode 10, migration particles are pushed on the substrate for display to be stable.

When the driving method in this embodiment is used, it is possible to avoid a problem that the charged migration particles 5 move also at the time of no voltage being applied since a flow occurs in a dispersion liquid in a pixel, a problem that viscosity of the insulating liquid 4 is not sufficient, and hence, the charged migration particles 5 performs inertia motion even after setting the voltage of all the electrodes at 0 V, a problem that the charged migration particles 5 move by an inverse electric field, or the like.

In addition, since an electric field is always formed in a vertical direction, the charged migration particles 5 do not float in the insulating liquid 4 for memory property of a display unit to increase.

Embodiment 6

FIGS. 10A to 10E illustrate an electrophoretic display apparatus of this embodiment. These drawings illustrate vertical sectional views of one pixel. With reference to these drawings, a driving method of this embodiment will be described by one pixel.

In this embodiment, two kinds of charged migration particles 11 and 12 which have reverse polarities mutually, have substantially equal grain size, and have the same color are included in substantially equivalent amounts in one pixel. However, the present invention is not limited to this embodiment, and is also applicable to a case that one side's grain size is larger and its number is smaller in comparison with another side's ones. In that case, so as to enable to achieve substantially equal halftones when voltages with equal absolute values and reverse polarities are applied, the grain sizes and particle numbers are adjusted.

Colors of particles do not need to be the entire same color, but it is sufficient so long as they seem to be the same color in a state of aggregation. It is also sufficient so long as charged migration particles with the same polarity include particles with two kinds of colors and seem to be the same color as that of another side with another polarity in a mixed state.

Figure 10A:
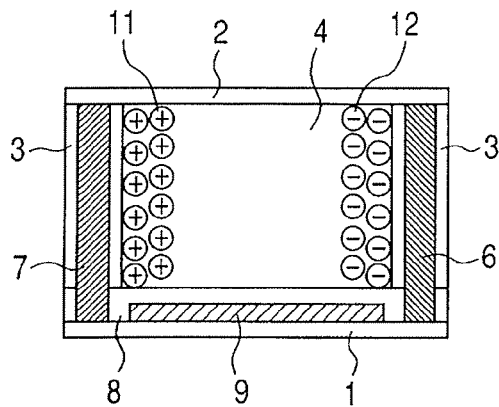
FIGS. 10A, 10B, 10C, 10D and 10E are sectional views for describing an electrophoretic display apparatus according to a sixth embodiment.

As for structure of a pixel and electrodes, not only that illustrated in FIG. 10A, but also that illustrated in FIG. 12 is sufficient.

Structure of a pixel is structure that a transparent liquid 4, and a dispersion liquid, containing substantially equivalent amounts of two or more charged migration particles 11 positively charged, and two or more charged migration particles 12 negatively charged, are filled. It is defined that the substantially equivalent amount means not only a case that grain sizes and particle numbers are the same respectively, but also a case that one side's grain size is larger and its number is small in comparison with another side's ones.

Electrode structure is the same as that illustrated in FIGS. 7A to 7E. The second substrate 2 is transparent and the insulating layer 8 is colored in white.

In this embodiment, it is made that the 3rd electrode 9 is a common electrode and the first electrode 6 and second electrode 7 are driving electrodes.

Figure 10D:
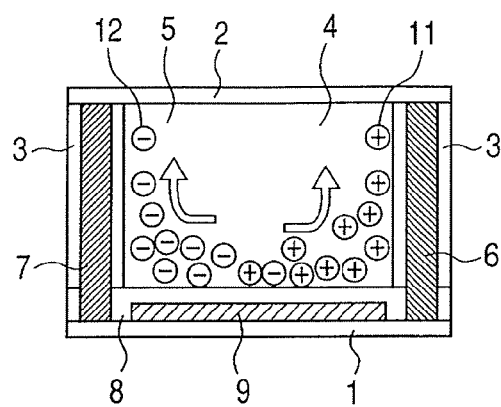
Figure 10B:
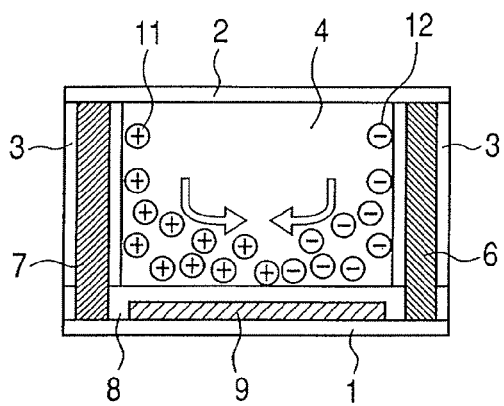
Figure 10E:
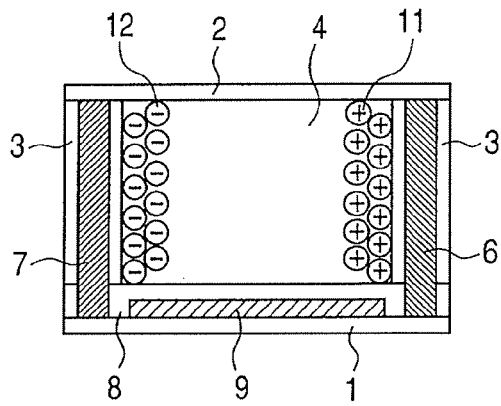
Figure 10C:
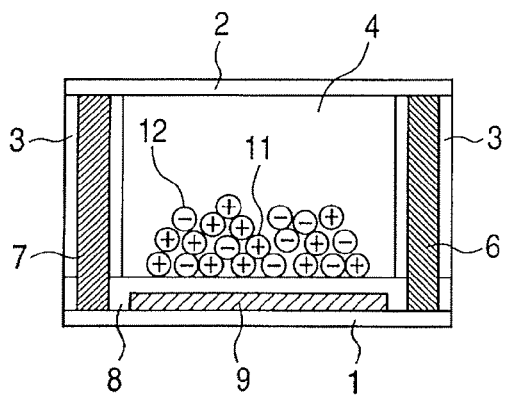

FIGS. 10A to 10E illustrate one displaying state, respectively. FIG. 10A illustrates a "white" display state, FIG. 10B illustrates a halftone display state, FIG. 10C illustrates a "black" display state, FIG. 10D illustrates a halftone display state with brightness same as that in FIG. 10B, and FIG. 10E illustrates another "white" display state.

FIG. 10A illustrates a reset state that the charged migration particles 11 with positive polarity are attracted to the second electrode 7, and the charged migration particles 12 with negative polarity are attracted to the first electrode 6.

A method at the time of performing halftone display and black display of a pixel from the particle distribution state in FIG. 10A will be illustrated.

When voltages are made into V1<V3<V2 at the time of the reset state illustrated in FIG. 10A, a direction of an electric field goes to the first electrode 6 through the third electrode 9 from the second electrode 7, or goes directly to the first electrode 6 from the second electrode 7. The charged migration particles 11 start to move toward the first electrode 6, and on the contrary, the charged migration particles 12 start to move toward the second electrode 7. At this time, since a most proximal section of the first electrode 6 and third electrode 9 has strong electric field strength and a most proximal section of the second electrode 7 and third electrode 9 has strong electric field strength, the charged migration particles 11 and 12 move as illustrated in FIG. 10B with being drawn near to the first substrate 1 side.

As illustrated in FIG. 10C, voltages are made into V1=V2=V3 or V3<V1=V2 after reaching a desired halftone display state. In addition, it is possible to display a halftone by modulating an applying time or magnitude of a voltage. In addition, in order to form a black display state, what is necessary is just to make voltages into V1=V2=V3 or V3<V1=V2 when the charged migration particles 11 and 12 cover up the pixel most.

When performing halftone display and black display from the reset state in FIG. 10E, after reaching a desired halftone display state or a desired black display state by making voltages into V2<V3<V1, they are made into V1=V2=V3 or V3<V1=V2.

As potential of the third electrode 9 which is an electrode common to all the pixels, for example, 0 V is conceivable, but the present invention is not limited to it.

When the driving method in this embodiment is used, since two kinds of charged migration particles 11 and 12 with mutually reverse polarities are used, rewriting speed to black display from white display becomes fast particularly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-001010, filed Jan. 6, 2006, which is hereby incorporated by reference herein in its entirety.

What is claimed is:

1. An electrophoretic display apparatus comprising:
a first substrate and a second substrate which are placed opposite mutually;
an electrophoresis dispersing liquid which holds charged migration particles and fills between the first substrate and the second substrate; and
a first electrode and a second electrode which are located in a pixel of the electrophoretic display and generate an electric field in the electrophoresis dispersing liquid according to a voltage applied, and whose display state is made to be a planar distribution state of the charged migration particles in the pixel in view of a direction perpendicular to the first substrate or second substrate, wherein the first electrode and the second electrode are located in an end portion of the pixel in view of a direction perpendicular to the first substrate or second substrate, and wherein a first planar distribution state that the charged migration particles spread on the first substrate or second substrate from the first electrode toward the second electrode, and a second planar distribution state that the charged migration particles spread on the first substrate or second substrate from the second electrode toward the first electrode are formed alternately, and the charged migration particles are changed into the second planar distribution state from the first planar distribution state without transferring the charged migration particles to an end portion of the second electrode, and the charged migration particles are changed into the first planar distribution state from the second planar distribution state without transferring the charged migration particles to an end portion of the first electrode.

2. The electrophoretic display apparatus according to claim 1, wherein a partition which blocks movement of the charged migration particles is provided between the first substrate and the second substrate, and the first electrode and the second electrode are arranged along with the partition, respectively.

3. The electrophoretic display apparatus according to claim 2, wherein the partition is arranged so as to surround a rectangular area, in view of a direction perpendicular to the first substrate or the second substrate, and the first electrode and the second electrode are arranged in mutually symmetric positions along with the partition.

4. The electrophoretic display apparatus according to claim 3, wherein the first electrode and the second electrode are arranged along with partitions of two opposite sides of a rectangular area, respectively.

5. The electrophoretic display apparatus according to claim 1, wherein the charged migration particles are constructed of two charged migration particles types having reverse polarities and the same color.

* * * * *